United States Patent
Raut et al.

(10) Patent No.: US 11,662,910 B2
(45) Date of Patent: May 30, 2023

(54) WORKLOAD AND INTERFACE COGNIZANT HEAT-TIERED STORAGE

(71) Applicant: INTERNATIONAL BUSINESS MACHINES CORPORATION, Armonk, NY (US)

(72) Inventors: Smita J. Raut, Pimple Saudagar (IN); Sandeep R. Patil, Pune (IN); Sachin C. Punadikar, Pune (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 15/887,718

(22) Filed: Feb. 2, 2018

(65) Prior Publication Data

US 2019/0243559 A1 Aug. 8, 2019

(51) Int. Cl.
*G06F 3/06* (2006.01)
*G06F 9/50* (2006.01)

(52) U.S. Cl.
CPC ............ *G06F 3/0613* (2013.01); *G06F 3/067* (2013.01); *G06F 3/0631* (2013.01); *G06F 3/0647* (2013.01); *G06F 9/5011* (2013.01)

(58) Field of Classification Search
CPC ...... G06F 3/0613; G06F 3/0647; G06F 3/067; G06F 9/5011; G06F 3/0631; G06F 9/4856; G06F 3/0649; G06F 3/0604; G06F 3/0685

See application file for complete search history.

(56) References Cited

U.S. PATENT DOCUMENTS

| | | | |
|---|---|---|---|
| 8,413,208 B2 * | 4/2013 | Sunada | H04L 63/166 726/1 |
| 8,566,483 B1 * | 10/2013 | Chen | G06F 3/0605 710/18 |
| 8,799,245 B2 | 8/2014 | Amarendran et al. | |
| 9,557,792 B1 * | 1/2017 | Potlapally | G06F 1/3206 |
| 9,571,581 B2 | 2/2017 | Musial et al. | |
| 9,613,040 B2 | 4/2017 | Olson et al. | |
| 9,946,465 B1 * | 4/2018 | Martin | G05B 13/0265 |
| 10,176,212 B1 * | 1/2019 | Prohofsky | G06F 17/30371 |
| 10,409,516 B1 * | 9/2019 | Kushner | G06F 16/20 |
| 2005/0055402 A1 * | 3/2005 | Sato | H04L 67/1097 709/205 |

(Continued)

*Primary Examiner* — Yu Zhao
(74) *Attorney, Agent, or Firm* — Brian F. Russell; Robert Sullivan

(57) ABSTRACT

A data storage system has multiple tiers of data storage including an upper tier having a lower access latency and a lower tier having a higher access latency. A storage controller of the data storage system receives, via an interface, an access request of a workload for a target file system object, where the target file system object has an associated temperature. In response to the access request for the target file system object, the storage controller accesses the target file system object in the data storage and conditions update of the associated temperature of the target file system object based on at least one of a set including the interface and the workload. The storage controller distributes a collection of file system objects including the target file system object among the multiple tiers based on respective heats of file system objects in the collection.

19 Claims, 5 Drawing Sheets

(56) References Cited

U.S. PATENT DOCUMENTS

| | | | |
|---|---|---|---|
| 2013/0305067 A1* | 11/2013 | Lefurgy | G06F 1/206 713/320 |
| 2013/0312005 A1* | 11/2013 | Chiu | G06F 3/061 718/105 |
| 2015/0058293 A1* | 2/2015 | Kobayashi | G06F 3/067 707/634 |
| 2015/0178191 A1* | 6/2015 | Camp | G06F 12/0246 711/103 |
| 2016/0011979 A1* | 1/2016 | Islam | G06F 12/0893 711/102 |
| 2016/0088020 A1* | 3/2016 | Chan | G06F 16/22 726/1 |
| 2016/0231928 A1* | 8/2016 | Lewis | H04L 67/1097 |
| 2017/0039232 A1* | 2/2017 | Jayanth | G06F 16/278 |
| 2017/0090776 A1* | 3/2017 | Kowles | G06F 3/0685 |
| 2017/0147237 A1 | 5/2017 | Fang et al. | |

\* cited by examiner

WORKLOAD AND INTERFACE COGNIZANT HEAT-TIERED STORAGE

BACKGROUND OF THE INVENTION

This disclosure relates to data processing and data storage, and more specifically, to workload and/or interface-cognizant heat-tiered storage.

In general, cloud computing refers to a computational model in which processing, storage, and network resources, software, and data are accessible to remote host systems, where the details of the underlying information technology (IT) infrastructure providing such resources is transparent to consumers of cloud services. Cloud computing is facilitated by ease-of-access to remote computing websites (e.g., via the Internet or a private corporate network) and frequently takes the form of web-based resources, tools or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of cloud computing has been facilitated by the widespread utilization of virtualization, which is the creation of virtual (rather than actual) versions of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different cloud computing customers. The virtualization of actual IT resources and management of VMs is typically provided by software referred to as a VM monitor (VMM) or hypervisor.

In a typical virtualized computing environment, VMs can communicate with each other and with physical entities in the IT infrastructure of the utility computing environment utilizing conventional networking protocols. As is known in the art, conventional networking protocols are commonly premised on the well-known seven layer Open Systems Interconnection (OSI) model, which includes (in ascending order) physical, data link, network, transport, session, presentation and application layers. VMs are enabled to communicate with other network entities as if the VMs were physical network elements through the substitution of a virtual network connection for the conventional physical layer connection.

In the current cloud computing environments in which data storage systems and host systems can be widely geographically and/or topologically distributed and the volume of data can be in the petabytes (i.e., a so-called "big data" environment), it is desirable to provide low latency access to frequently accessed data, while still retaining (e.g., archiving) less frequently accessed data. To provide such low latency access to stored data, it is conventional to implement multiple tiers of data storage, with storage devices having smaller storage capacities, higher performance, and higher per-byte cost at the upper tiers and storage devices having larger storage capacities, lower performance, and lower per-byte cost at the lower tiers. Data are then distributed among the tiers based on a "heat" metric providing an indication of the frequency and/or recency of access, with "hotter" data (i.e., more frequently and/or recently accessed data) placed in the upper tiers and "colder" (i.e., less frequently and/or recently accessed data) placed in the lower tiers.

BRIEF SUMMARY

The present disclosure appreciates that one drawback of conventional heat-based storage tiering policies is that the distribution of data among the storage tiers does not take into account the computational workloads (e.g., applications) accessing the data or the interfaces (e.g., protocols) being used to access the data. As a result, the access latency experienced by the end users for given data may not correspond to the priorities of the end users.

For example, a data storage system may permit concurrent access to a given collection of files and/or other file system objects via multiple protocols. One or more of the protocols may be employed for end user access to the contents of the collection, while one or more other protocols may be employed for accesses by a management process, for example, to perform in-place analytics over the data collection. In general, the management process does not have any latency requirements for its accesses to the data collection, and hence, does not require any of the data it accesses to be maintained in the upper tier(s) of the storage system. However, because the management process is potentially accessing the files and objects in the same collection as end user(s), the management process accesses can artificially increase the heat of the accessed files and thereby skew application of the heat-based tiering policy and result in lower priority data being stored in higher tiers of the storage system. Further, because the storage capacities of the upper tiers of the storage system are necessarily limited, movement of data accessed by the management process into the upper tier(s) of data storage may also trigger the eviction of files and objects from the upper tier(s) to the lower (and slower) tiers. This skewed distribution of files and objects can increase rather than decrease the latencies of end user accesses to the contents of the data collection.

In order to address such issues and to provide intelligent heat-based storage tiering in a data storage system, a workload and interface-cognizant heat-tiered storage policy can be implemented. In at least one embodiment, a data storage system has multiple tiers of data storage including an upper tier having a lower access latency and a lower tier having a higher access latency. A storage controller of the data storage system receives, via an interface, an access request of a workload for a target file system object, where the target file system object has an associated temperature. In response to the access request for the target file system object, the storage controller accesses the target file system object in the data storage and conditions update of the associated temperature of the target file system object based on at least one of a set including the interface and the workload. The storage controller distributes a collection of file system objects including the target file system object among the multiple tiers based on respective heats of file system objects in the collection.

DETAILED DESCRIPTION

Figure 1:
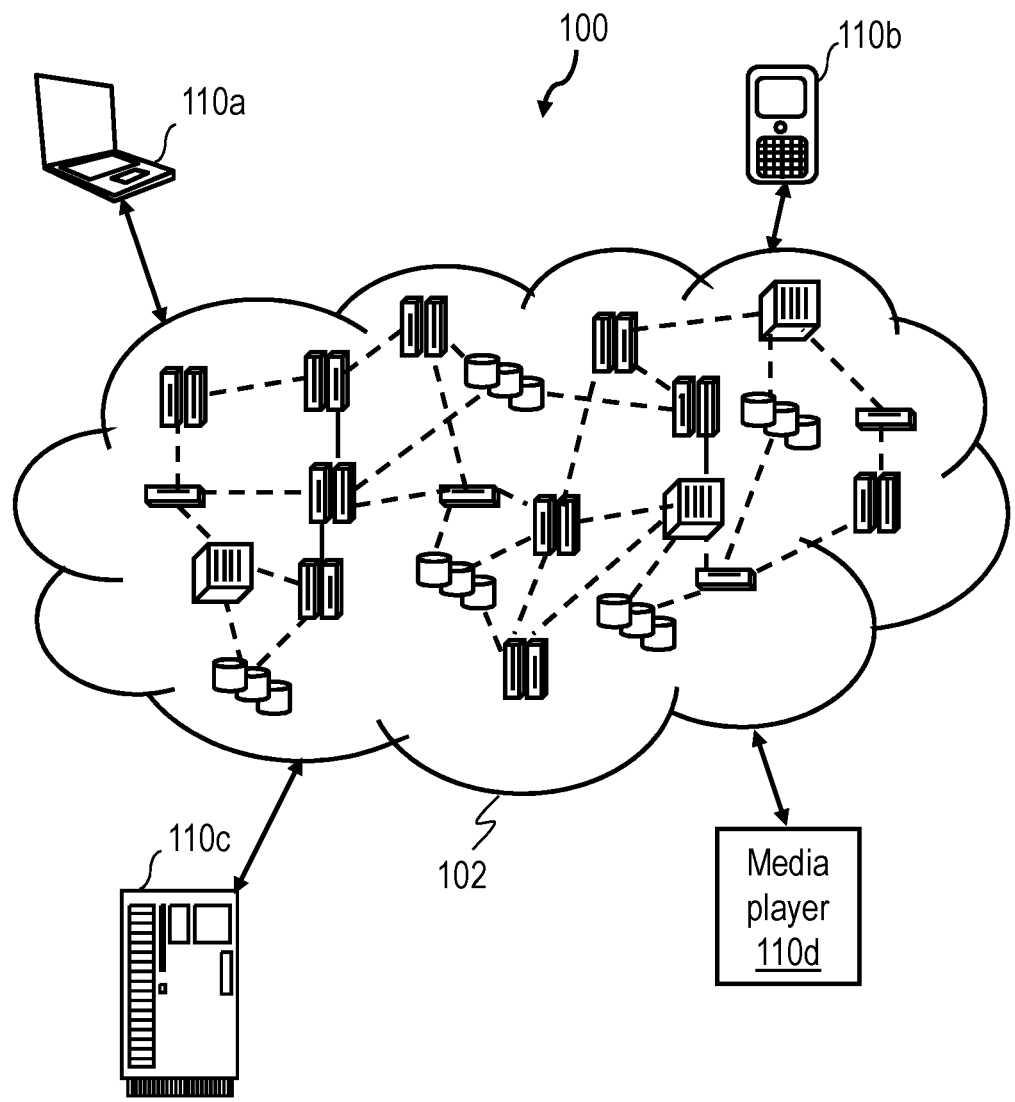
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100, which in the depicted embodiment is a cloud computing environment, includes a collection of computing resources commonly referred to as a cloud 102. Computing and data storage resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms, and/or software as services accessible to host devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of host devices 110 shown in FIG. 1 are illustrative only and that host devices 110 can be any type of electronic device capable of communicating with and accessing services of computing and data resources in collection 110 via a packet network.

Figure 2:
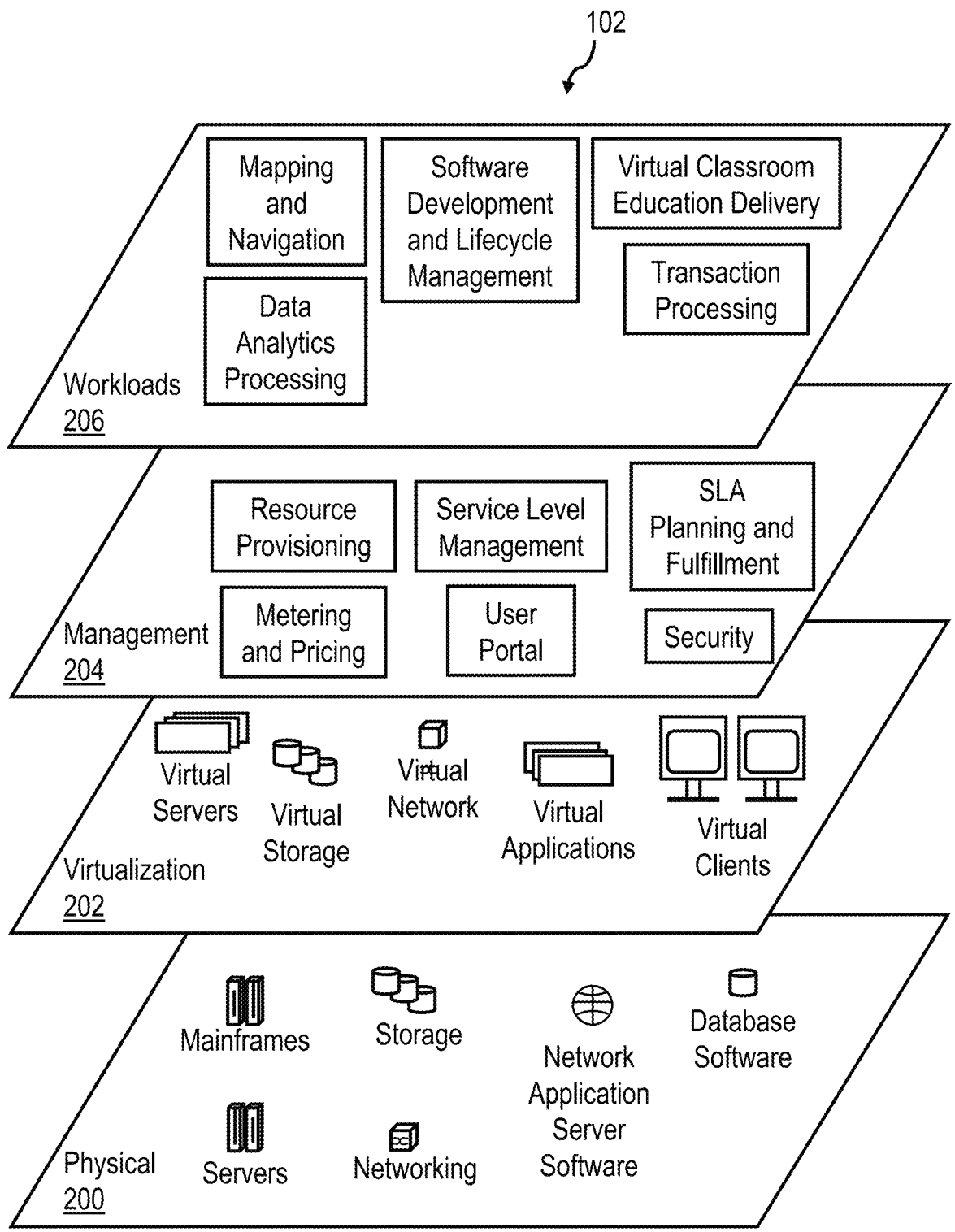
FIG. 2 depicts the layering of virtual and physical resources in the exemplary data processing environment of FIG. 1 in accordance with one embodiment.

FIG. 2 is a layer diagram depicting exemplary virtual and physical resources residing in collection of cloud 102 of FIG. 1 in accordance with one embodiment. It should be understood that the computing and data storage resources, layers, and functions shown in FIG. 2 are intended to be illustrative only and embodiments of the claimed inventions are not limited thereto.

As depicted, cloud 102 includes a physical layer 200, a virtualization layer 202, a management layer 204, and a workloads layer 206. Physical layer 200 includes various physical hardware and software components that can be used to instantiate virtual entities for use by the cloud service provider and its customers. As an example, the hardware components may include mainframes (e.g., IBM® zSeries® systems), servers (e.g., IBM pSeries® systems), data storage systems (e.g., flash drives, magnetic drives, optical drives, tape drives, etc.), physical networks, and networking components (e.g., routers, switches, etc.). The software components may include, for example, operating system software (e.g., Windows, Linux, Android, iOS, etc.), network application server software (e.g., IBM WebSphere® application server software, which includes web server software), and database software.

The computing resources residing in physical layer 200 of cloud 102 are virtualized and managed by one or more virtual machine monitors (VMMs) or hypervisors. The VMMs present a virtualization layer 202 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by host devices 110 of cloud consumers on-demand.

The VMM(s) also support a management layer 204 that implements various management functions for the cloud 102. These management functions can be directly implemented by the VMM(s) and/or one or more management or service VMs running on the VMM(s) and may provide functions such as resource provisioning, metering and pricing, security, user portal services, service level management, and service level agreement (SLA) planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The SLA planning and fulfillment function provides pre-arrangement for, and procurement of, cloud computing resources for which a future requirement is anticipated in accordance with an SLA.

Workloads layer 206, which may be implemented by one or more consumer VMs, provides examples of functionality for which the cloud computing environment may be utilized. Examples of workloads and functions which may be provided from workloads layer 206 include: mapping and navigation; software development and lifecycle management; virtual classroom education delivery; data analytics processing; and transaction processing. Of course, in other environments alternative or additional workloads may be executed.

Figure 3:
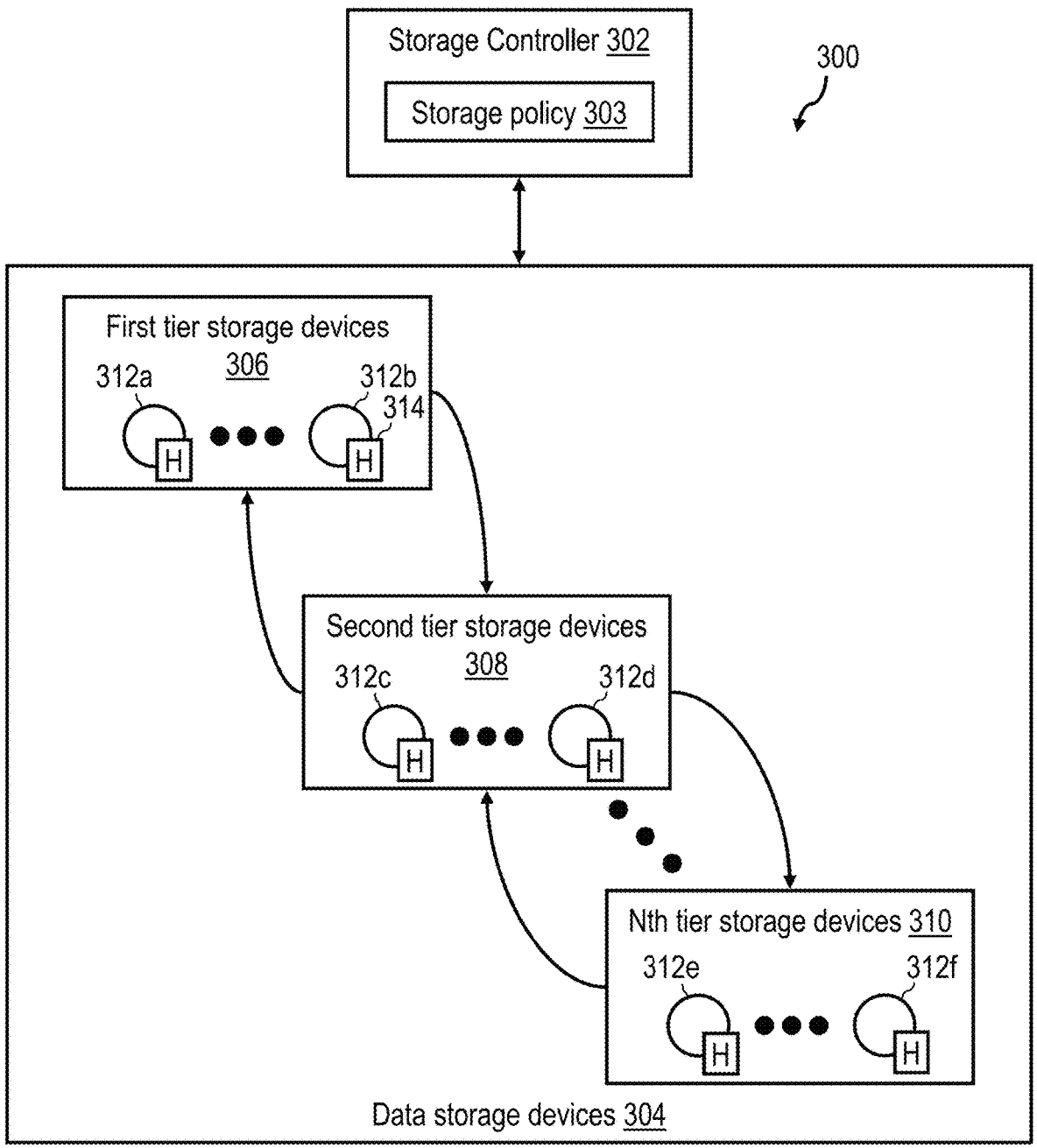
FIG. 3 is a high level block diagram of exemplary data storage system in the data processing environment of FIG. 1.

With reference now to FIG. 3, there is illustrated a high level block diagram of an exemplary data storage system 300 within physical layer 200 of cloud 102. As shown, data storage system 300 includes at least one storage controller 302, which is coupled for communication with, and controls operation of, a collection of possibly heterogeneous data storage devices 304. Storage controller 302 may be implemented entirely in hardware or may include a hardware platform (e.g., a processor and associated memory) that executes firmware and/or software. Storage controller 302 manages data storage devices 304 in accordance with a storage policy 303, which can be updated from time-to-time, for example, by a storage administrator of data storage system 300.

In accordance with storage policy 303, storage controller 302 preferably organizes and manages data storage devices 304 in multiple tiers, which can be formed, for example, based on the access latency, storage capacity, estimated useful lifetime, data storage duration, data priority, and/or other characteristics of stored data and/or the underlying storage media. In one preferred embodiment, the data storage devices 304 forming each of the various tiers of data storage devices 304 have similar access latencies. Thus, for example, first tier storage devices 306 can include one or more data storage devices, such as flash or other non-volatile memory devices, having relatively low access latencies as well as relatively low storage capacities. Data storage devices 304 may further include second tier storage devices 308, such as magnetic disks, having higher access latencies, but also providing greater storage capacities than first tier storage devices 306. Data storage devices 304 may optionally include one or more additional lower tiers of storage, such as Nth tier storage devices 310 (e.g., magnetic tape storage), providing even greater storage capacities at even higher access latencies. Nth tier storage devices 310 may be employed, for example, to provide archival data storage.

In accordance with storage policy 303, storage controller 302 also preferably maintains a respective heat attribute 314 for each of a plurality of file system objects 312a-312f distributed among the tiers 306, 308, . . . , 310 of data storage devices 304. The heat attribute 314 indicates a frequency and/or recency of access of the associated file system object 312 and is preferably computed by storage controller 302 in accordance with a heat formula specified by storage policy 303. In one particular example, the heat formula includes a built-in decay (e.g., an exponential decay) so that unaccessed file system objects 312 become colder as the time since the most recent access increases. In general, storage controller 302 maintains the hottest file system objects 312a-312b (e.g., those most frequently accessed) in first tier storage devices 306, the next hottest file system objects 312c-312d in second tier storage devices 308, and the coldest file system objects 312e-312f in Nth tier storage devices 310. This arrangement can be achieved, for example, by applying various heat thresholds specified by storage policy 303 to distribute file system objects 312 among the various tiers 306, 308, . . . , 310 based on the values of their heat attributes 314, while reserving appropriate amounts of unused storage capacity at one or more tiers 306, 308, . . . , 310.

Figure 4:
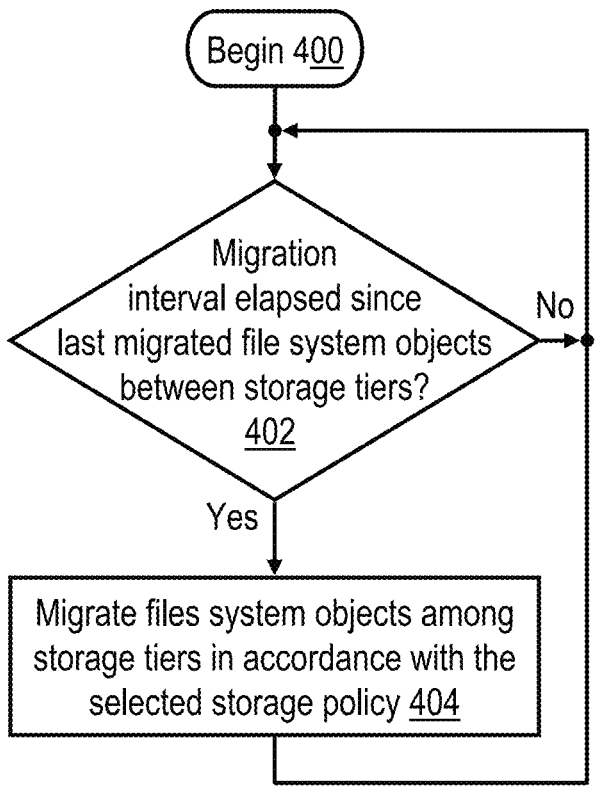
FIG. 4 is a high level logical flowchart of an exemplary process for heat-based management of a tiered data storage system in accordance with one embodiment.

Referring now to FIG. 4, there is depicted a high level logical flowchart of an exemplary process by which a storage controller can implement heat-based management of a tiered data storage system in accordance with one embodiment. For ease of understanding, the process shown in FIG. 4 (and the additional process given in FIG. 5) will be described with reference to the management of data storage system 300 performed by storage controller 302 in accordance with storage policy 303.

The illustrated process begins at block 400 and thereafter proceeds to block 402, which illustrates storage controller 302 waiting until a migration interval has elapsed since storage controller 302 last performed a heat-based migration of file system objects between the various tiers of storage device in data storage system 300. In various implementations, the migration interval, which is defined by the storage policy 303 presently implemented by storage controller 302, may be, for example, one day, a few days, or a week. In response to storage controller 302 determining at block 402 that a migration interval has elapsed since a heat-based migration of file system objects has been performed, the process proceeds from block 402 to block 404.

Block 404 illustrates storage controller 302 migrating file system objects 312 between tiers 306, 308, . . . , 310 in accordance with their respective heat attributes 314. For example, assuming a heat attribute range of 0 . . . 100, where 0 corresponds to a minimum access frequency and 100 corresponds to a maximum access frequency, storage controller 302 may perform the necessary migrations of file system objects 312 to place file system objects 312 having a heat greater than 80 in first tier storage devices 306, file system objects 312 having a heat of 31 to 80 in second tier storage devices 308, and file system objects 312 having a heat of 30 or less in Nth tier storage devices 310. As indicated by arrows in FIG. 3, this migration may entail storage controller 302 migrating various file system objects 312 upward or downward between storage tiers to achieve the desired heat-based distribution determined by storage policy 303. Following block 404, the process of FIG. 4 returns to block 402, which has been described.

As noted above, implementation of heat-based tiering does not, by itself, guarantee optimal (or event improved) access latencies to file system objects 312 for end users utilizing host devices 110. Accordingly, the heat-based tiering implemented in accordance with storage policy 303 preferably takes into account the workloads (e.g., applications and/or processes) accessing the file system objects 312, and/or the interfaces through which the workloads access the file system objects 312, and/or the types of access requested. As a result, accesses to file system objects 312 will affect the values of the heat attributes 314 upon which tiering decisions are made only if, and to the extent, specified by the storage policy 303.

Figure 5:
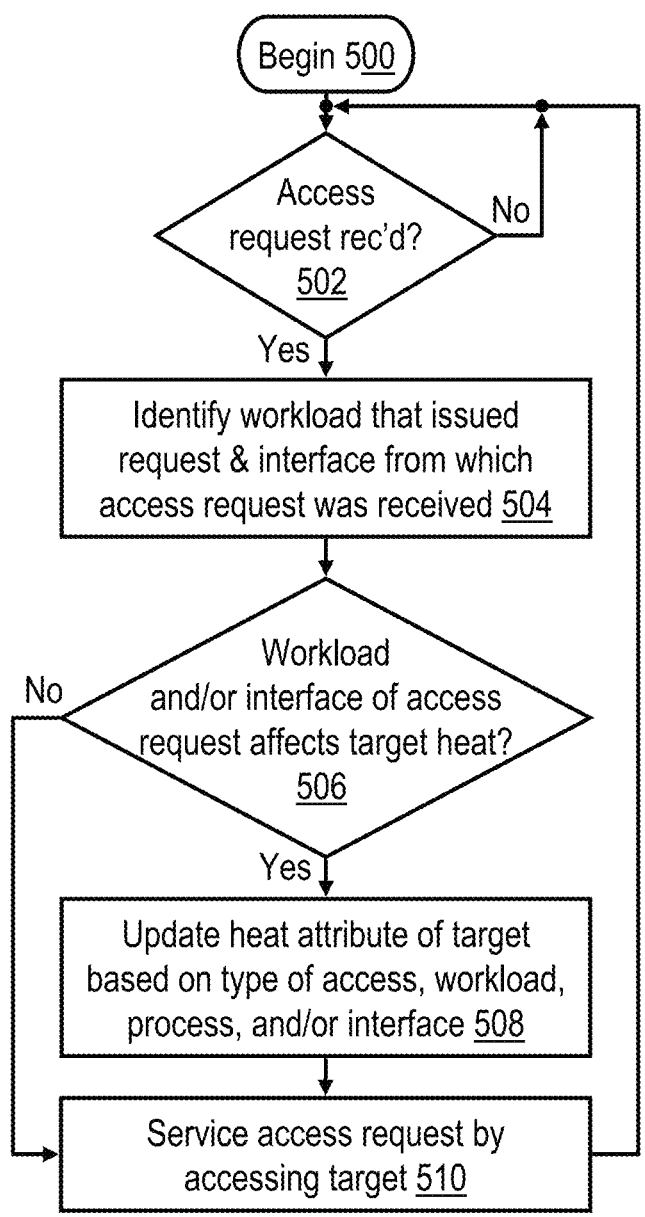
FIG. 5 is a high level logical flowchart of an exemplary process for updating the heat attribute of a file system object in accordance with one embodiment.

With reference now to FIG. 5, there is illustrated a high level logical flowchart of an exemplary process for updating the heat attribute of a file system object in accordance with one embodiment.

The process of FIG. 5 begins at block 500 and thereafter proceeds to block 502, which depicts storage controller 302 awaiting receipt of an access request (e.g., a read, write, or open request) from a workload executing either within cloud 102 or on an external system, such as a host device 110. In response to receipt of a request by storage controller 302, the process proceeds to block 504. At block 504, storage controller 302 identifies the workload (e.g., application and/or process) that issued the access request and the interface (e.g., protocol) through which the access request was received. In general, storage controller 302 permits the collection of file system objects 312 distributed among the tiers of data storage system 300 to be accessed by multiple applications and processes via a plurality of different interfaces. For example, storage controller 302 may enable applications and their processes to access to file system objects 312 via Network File System (NFS), Server Message Block (SMB), Common Internet File System (CIFS), HyperText Transport Protocol (HTTP), Amazon S3, Swift, File Transport Protocol (FTP), Portable Operating System Interface (POSIX), Web Distributed Authoring and Versioning (WebDAV), Hadoop Distributed File System (HDFS), among others.

At block 506, storage controller 302 determines whether or not the storage policy 303 presently implemented by storage controller 302 permits the workload and/or interface identified at block 504 to affect the heat of the file system object 312 targeted by the access request. In various implementations, storage policy 303 may specify via a configurable parameter any combination of one or more of application, process, interface, and/or request types from which access requests will (or will not) be included in the heat formula utilized to calculate the heat of the target file system object 312. Further, storage policy 303 may additionally support the specification, via configurable parameters, of different weights for accesses of different combinations of application, process, interface, and/or request type. As a result, some accesses, while still affecting the heat of the target file system object 312, may affect the heat less than (or more than) other accesses.

In response to a negative determination at block 506, the process passes from block 506 to block 510, which illustrates storage controller 302 servicing the access request (e.g., by opening, reading or writing the target file system object 312) without updating the heat attribute of the target file system object 312. Thereafter, the process returns to block 502, and following blocks, which have been described.

Returning to block 506, in response to storage controller 302 determining that storage policy 303 permits the access request to affect the heat attribute of the target file system object 312, storage controller 302 updates the heat attribute 314 of the target file system object 312 based on the type of access requested (e.g., read, write, or open), the requesting workload, the requesting process, and/or the interface employed by the access request (block 508). The update depicted at block 508 may be further based on other extended attributes, such as the number of reads and writes and the last access time.

In one embodiment, the process illustrated at block 508 can be implemented through logic expressed in the following pseudocode:

```
For a given time period (t),
{
    Monitor Access of a given file (f)
        if read( ) on f
            (process_id = process_reading_file_f( ))
            if (process_id == fileheatignoreprocess)
            //if the process or protocol accessing the file is specified to
            //be ignored, then do not impact the file heat
                skip;
            elif (process_id==fileheat%weightperprocess)
                Heat_count_of_f_read = func_weight( )
                //func_weight( ) returns the heat based % of importance
                //the process accessing the data has been assigned.
            else
                Heat_count_of_f_read= x
        if write( ) on f
            (process_id = process_reading_file_f( ))
            if (process_id == fileheatignoreprocess)
            //if the process or protocol accessing the file is specified to
            //be ignored, then do not impact the file heat
                skip;
            elif (process_id==fileheat%weightperprocess)
                Heat_count_of_f_write= func_weight( )
                //func_weight( ) returns the heat based % of importance
                //the process accessing the data has been assigned.
            else
                Heat_count_of_f_write = y
        if open( ) on f
            (process_id = process_reading_file_f( ))
            if (process_id == fileheatignoreprocess)
            //if the process or protocol accessing the file is specified to
            //be ignored, then do not impact the file heat
                skip;
```

```
        elif (process_id==fileheat%weightperprocess)
            Heat_count_of_f_open= func_weight( )
            //func_weight( ) returns the heat based % of importance
            //the process accessing the data has been assigned.
        else
            Heat_count_of_f_open= z
}
overall_file_heat_of_f = func(x,y,z)
    // where func( ) is a function which weights the
    //relative importance of read, write, and open calls
    and gives the final heat value.
```

As noted above, as chronological time elapses, storage controller 302 also preferably re-calculates the heat attributes 314 periodically to reduce the heat of unaccessed file system objects 312 by an amount specified by a configurable file heat loss parameter of storage policy 303. Following block 508, the process of FIG. 5 passes to block 510 and following blocks, which have been described.

As has been described, in at least one embodiment, a data storage system has multiple tiers of data storage including an upper tier having a lower access latency and a lower tier having a higher access latency. A storage controller of the data storage system receives, via an interface, an access request of a workload for a target file system object, where the target file system object has an associated temperature. In response to the access request for the target file system object, the storage controller accesses the target file system object in the data storage and conditions update of the associated temperature of the target file system object based on at least one of a set including the interface and the workload. The storage controller distributes a collection of file system objects including the target file system object among the multiple tiers based on respective heats of file system objects in the collection.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of controlling a data storage system having multiple tiers of data storage including an upper tier having a lower access latency and a lower tier having a higher access latency, the method comprising:
a storage controller of the data storage system maintaining, in association with each of a plurality of file system objects in the data storage, a respective temperature having a value indicative of importance of one more processes among a plurality of processes that have accessed the target file system object utilizing at least one of multiple interface protocols, wherein each of the multiple interface protocols is utilized by at least one of the one or more processes to make both read and write accesses to one or more of the plurality of file system objects;
based on receiving, from a requesting process among the one or more processes, an access request for a target file system object among the plurality of file system objects, the storage controller accessing the target file system object in the data storage, determining an amount of a change to the value of the associated temperature of the target file system object, and applying the determined amount of the change to the value of the associated temperature, wherein the determining includes determining the amount of the change based on at least which of the multiple interface protocols was utilized to receive the access request from the requesting process, such that the amount of the change differs for different ones of the multiple interface protocols; and
the storage controller distributing the plurality of file system objects including the target file system object among the multiple tiers based on respective temperatures of the plurality of file system objects.

2. The method of claim 1, wherein the access request is received by the storage controller from a host data processing system, and wherein determining the amount of the change to the value of the associated temperature includes determining the amount of the change to the value of the associated temperature based on from which of multiple workloads executing on the host data processing system the access request was received.

3. The method of claim 1, wherein:
the access request is received by the storage controller from a host data processing system; and
the storage controller determining the amount of the change to the value of the associated temperature includes the storage controller determining no change is to be made to the value of the associated temperature.

4. The method of claim 3, wherein the storage controller determining no change is to be made to the value of the associated temperature includes the storage controller determining no change is to be made to the value of the associated temperature of the target file system object based on the requesting process being a management workload of the data storage system.

5. The method of claim 1, wherein:
the storage controller has a multiple interfaces; and
each of multiple interface protocols is employed by a respective one of the multiple interfaces.

6. The method of claim 1, wherein the plurality of interface protocols includes at least three interface protocols.

7. A data storage system, comprising:
a storage controller for data storage including an upper tier having a lower access latency and a lower tier having a higher access latency, wherein the storage controller includes a processor and associated memory and is configured to perform:
maintaining, in association with each of a plurality of file system objects in the data storage, a respective temperature having a value indicative of importance of one more processes among a plurality of processes that have accessed the target file system object utilizing at least one of multiple interface protocols, wherein each of the multiple interface protocols is utilized by at least one of the one or more processes to make both read and write accesses to one or more of the plurality of file system objects;
based on receiving, from a requesting process among the one or more processes, an access request for a target file system object among the plurality of file system objects, accessing the target file system object in the data storage, determining an amount of a change to the value of the associated temperature of the target file system object, and applying the determined amount of the change to the value of the associated temperature, wherein the determining includes determining the amount of the change to the value of the associated temperature of the target file system object based on at least which of the multiple interface protocols was utilized to receive the access request from the requesting process, such that the amount of the change differs for different ones of the multiple interface protocols; and
distributing the plurality of file system objects including the target file system object among the multiple tiers based on respective temperatures of the plurality of file system objects.

8. The data storage system of claim 7, wherein the access request is received by the storage controller from a host data processing system, and wherein determining the amount of the change to the value of the associated temperature includes determining the amount of the change to the value of the associated temperature based on from which of multiple workloads executing on the host data processing system the access request was received.

9. The data storage system of claim 7, wherein:
the access request is received by the storage controller from a host data processing system; and
determining the amount of the change to the value of the associated temperature includes the storage controller determining no change is to be made to the value of the associated temperature.

10. The data storage system of claim 9, wherein the storage controller determining no change is to be made to the value of the associated temperature includes the storage controller determining no change is to be made to the value of the associated temperature of the target file system object based on the requesting process being a management workload of the data storage system.

11. The data storage system of claim 7, and further comprising the data storage.

12. The data storage system of claim 7, wherein:
the storage controller has a multiple interfaces; and
each of multiple interface protocols is employed by a respective one of the multiple interfaces.

13. The data storage system of claim 7, wherein the plurality of interface protocols includes at least three interface protocols.

14. A computer program product, the computer program product comprising a computer readable storage medium having program instructions embodied therewith, the program instructions executable by a storage controller of a data storage system including an upper tier having a lower access latency and a lower tier having a higher access latency to cause the storage controller to perform:
   maintaining, in association with each of a plurality of file system objects in the data storage, a respective temperature having a value indicative of importance of one more processes among a plurality of processes that have accessed the target file system object utilizing at least one of multiple interface protocols, wherein each of the multiple interface protocols is utilized by at least one of the one or more processes to make both read and write accesses to one or more of the plurality of file system objects;
   based on receiving, from a requesting process among the one or more processes, an access request for a target file system object among the plurality of file system objects, accessing the target file system object in the data storage, determining an amount of a change to the value of the associated temperature of the target file system object, and applying the determined amount of the change to the value of the associated temperature, wherein the determining includes determining the amount of the change to the value of the associated temperature of the target file system object based on at least which of the multiple interface protocols was utilized to receive the access request from the requesting process, such that the amount of the change differs for different ones of the multiple interface protocols; and
   distributing the plurality of file system objects including the target file system object among the multiple tiers based on respective temperatures of the plurality of file system objects.

15. The computer program product of claim 14, wherein the access request is received by the storage controller from a host data processing system, and wherein determining the amount of the change to the value of the associated temperature includes determining the amount of the change to the value of the associated temperature based on from which of multiple workloads executing on the host data processing system the access request was received.

16. The computer program product of claim 14, wherein:
   the access request is received by the storage controller from a host data processing system; and
   determining the amount of the change to the value of the associated temperature includes the storage controller determining no change is to be made to the value of the associated temperature.

17. The computer program product of claim 16, wherein the storage controller determining no change is to be made to the value of the associated temperature includes the storage controller determining no change is to be made to the value of the associated temperature of the target file system object based on the requesting process being a management workload of the data storage system.

18. The computer program product of claim 14, wherein:
   the storage controller has a multiple interfaces; and
   each of multiple interface protocols is employed by a respective one of the multiple interfaces.

19. The computer program product of claim 14, wherein the plurality of interface protocols includes at least three interface protocols.

* * * * *